United States Patent
Yoo et al.

(10) Patent No.: US 10,756,368 B2
(45) Date of Patent: Aug. 25, 2020

(54) FUEL CELL SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventors: Jae Yeong Yoo, Yongin-si (KR); Kyuil Lee, Yongin-si (KR); Jae Won Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 371 days.

(21) Appl. No.: 15/648,778

(22) Filed: Jul. 13, 2017

(65) Prior Publication Data

US 2018/0183081 A1  Jun. 28, 2018

(30) Foreign Application Priority Data

Dec. 27, 2016 (KR) .................... 10-2016-0179846

(51) Int. Cl.
*H01M 8/04828* (2016.01)
*H01M 8/04537* (2016.01)
*H01M 8/04492* (2016.01)
*H01M 8/0444* (2016.01)
*H01M 8/1018* (2016.01)

(52) U.S. Cl.
CPC ..... *H01M 8/04828* (2013.01); *H01M 8/0444* (2013.01); *H01M 8/04492* (2013.01); *H01M 8/04559* (2013.01); *H01M 8/04589* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 8,795,908 B2* | 8/2014 | Kaito | H01M 8/04365 429/400 |
| 2007/0092771 A1* | 4/2007 | Wake | H01M 8/04179 429/414 |
| 2008/0299420 A1* | 12/2008 | Kelley | H01M 8/04126 429/411 |
| 2009/0286109 A1* | 11/2009 | Araki | H01M 8/04126 429/483 |
| 2013/0130140 A1* | 5/2013 | Kato | H01M 8/0432 429/429 |

(Continued)

FOREIGN PATENT DOCUMENTS

| JP | 2012-178286 A | 9/2012 |
|---|---|---|
| KR | 10-0882659 B1 | 2/2009 |

(Continued)

*Primary Examiner* — Rena Dye Cronin
(74) *Attorney, Agent, or Firm* — Morgan, Lewis & Bockius LLP

(57) ABSTRACT

A fuel cell system includes: a fuel cell stack; a sensor configured to sense a current and a voltage of the fuel cell stack; and a controller configured to acquire weight information based on a relationship between a usage time of a fuel cell and the current or voltage of the fuel cell stack and to determine a humidity state of the fuel cell stack based on the weight information, the current of the fuel cell stack and the voltage of the fuel cell stack.

14 Claims, 9 Drawing Sheets

(56) References Cited

U.S. PATENT DOCUMENTS

2013/0316257 A1* 11/2013 Mizuno ............ H01M 8/04559
  429/423
2016/0141688 A1  5/2016 Shiokawa et al.
2017/0301835 A1* 10/2017 Singer ................. H01L 33/0095

FOREIGN PATENT DOCUMENTS

KR  10-2016-0066753 A  6/2016
KR  10-1628443 B1  6/2016

* cited by examiner

FUEL CELL SYSTEM AND METHOD OF CONTROLLING THE SAME

CROSS-REFERENCE TO RELATED APPLICATION

This application claims the benefit of priority to Korean Patent Application No. 10-2016-0179846, filed on Dec. 27, 2016, the disclosure of which is incorporated herein by reference in its entirety.

TECHNICAL FIELD

The present disclosure relates to a fuel cell system and a control method thereof.

BACKGROUND

A fuel cell is a power generation device that converts chemical energy of a fuel into electricity by reacting it electrochemically in a fuel cell stack without converting the chemical energy into heat by combustion. The fuel cell supplies electric power for industrial, household and vehicle driving, and also is applied to the power supply of small electrical and electronic products.

If water generated when hydrogen ions on an anode side of the fuel cell stack react with oxygen on a cathode side to generate electricity is not discharged smoothly to the outside of the fuel cell stack, the area in which hydrogen ions and oxygen react is reduced. Since the same current needs to be generated within the reduced area, the current density in an electrolyte membrane in the fuel cell stack sharply increases, so that a heat generation rate is also increased and a hydrogen starvation phenomenon occurs. Accordingly, the endurance of the fuel cell stack is significantly lowered.

A fuel cell vehicle drives a driving motor by generating electricity using hydrogen in a hydrogen tank and oxygen in the air as a raw material in a fuel cell stack. Whenever the fuel cell vehicle generates electricity, heat and generated water become a by-product. At this time, the fuel cell stack, which is a core component in the fuel cell vehicle, needs to be humidified as much as possible. If the internal humidification state of the fuel cell stack is in a dry state, the electrolyte membrane is also in a dry state, and hydrogen ion migration is not smooth, thereby deteriorating the performance of the fuel cell stack.

Therefore, there is a need to monitor the dry state of the stack. In the conventional technology, the dry state of the stack is derived based on the relationship between the current and the voltage flowing in the stack. However, the result is inaccurate.

SUMMARY OF THE DISCLOSURE

One aspect of the present disclosure is to provide a fuel cell system and a method of controlling the same that improve the accuracy in a deriving humidification state of a fuel cell stack by reflecting a usage pattern of a fuel cell and the durability of the fuel cell.

In accordance with an exemplary embodiment of the present disclosure, a fuel cell system comprising: a fuel cell stack; a sensor configured to sense a current and a voltage of the fuel cell stack; and a controller configured to acquire weight information on the basis of a relationship between a usage time of a fuel cell and the current or voltage of the fuel cell stack and to determine a humidity state of the fuel cell stack on the basis of the weight information, the current of the fuel cell stack, and the voltage of the fuel cell stack.

The controller may acquire the weight information including a utilization rate that is calculated on the basis of a relationship between a usage time of the fuel cell and a usage time of the fuel cell by each magnitude of the current of the fuel cell stack.

The controller may acquire the weight information including a continuous utilization rate that is calculated on the basis of a relationship between a continuous usage time of current of the fuel cell stack and a continuous usage time of current of the fuel cell stack by each magnitude of the current of the fuel cell stack.

The sensor may sense a temperature of the fuel cell stack.

The controller may be configured to: acquire a durability of the fuel cell stack on the basis of the temperature of the fuel cell stack and acquire the weight information by changing the utilization rate and the continuous utilization rate on the basis of the durability of the fuel cell stack.

The controller may reset the weight information, the current of the fuel cell stack, and the voltage of the fuel cell stack when the usage time of the fuel cell exceeds a reference time.

The controller may calculate a reference voltage corresponding to the current of the fuel cell on the basis of a relationship between the current of the fuel cell stack and the voltage of the fuel cell stack when the usage time of the fuel cell is less a reference time.

The controller may be configured to: calculate a relationship between the current of the fuel cell stack and the voltage of the fuel cell stack to which the weight information is applied; and count the number of times the voltage of the fuel cell stack is lower than the reference voltage corresponding to the current of the fuel cell stack in the relationship between the current of the fuel cell stack and the voltage of the fuel cell stack to which the weight information is applied.

The controller may determine the fuel cell stack to be in a dry state when the counted number of times the voltage of the fuel cell stack, which is lower than the reference voltage corresponding to the current of the fuel cell stack, exceeds a predetermined number of times in the relationship between the current of the fuel cell stack and the voltage of the fuel cell stack to which the weight information is applied.

The fuel cell system further comprising a stack humidifier configured to increase a humidity of the fuel cell stack, The controller may increase the humidity of the fuel cell stack by using the stack humidifier when the fuel cell stack is in a dry state.

A method of controlling a fuel cell system, the method comprising: sensing a current and a voltage of a fuel cell stack; acquiring weight information on the basis of a relationship between a usage time of a fuel cell and the current or voltage of the fuel cell stack; and determining a humidity state of the fuel cell stack on the basis of the weight information, the current of the fuel cell stack, and the voltage of the fuel cell stack.

The acquiring of the weight information may include acquiring the weight information including a utilization rate that is calculated on the basis of a relationship between a usage time of the fuel cell and a usage time of the fuel cell by each magnitude of the current of the fuel cell stack.

The acquiring of the weight information may include acquiring the weight information including a continuous utilization rate that is calculated on the basis of a relationship between a continuous usage time of current of the fuel cell stack and a continuous usage time of current of the fuel cell stack by each magnitude of current of the fuel cell stack.

The method of controlling a fuel cell system further comprising sensing a temperature of the fuel cell stack.

The acquiring of the weight information may include acquiring a durability of the fuel cell stack on the basis of the temperature of the fuel cell stack and acquiring the weight information by changing the utilization rate and the continuous utilization rate on the basis of the durability of the fuel cell stack.

The determining of the humidity state of the fuel cell stack may include resetting the weight information, the current of the fuel cell stack, and the voltage of the fuel cell stack when the usage time of the fuel cell exceeds a reference time.

The determining of the humidity state of the fuel cell stack may include calculating a reference voltage corresponding to the current of the fuel cell on the basis of a relationship between the current of the fuel cell stack and the voltage of the fuel cell stack when the usage time of the fuel cell is less a reference time.

The determining of the humidity state of the fuel cell stack may include: calculating a relationship between the current of the fuel cell stack and the voltage of the fuel cell stack to which the weight information is applied; and counting the number of times the voltage of the fuel cell stack is lower than the reference voltage corresponding to the current of the fuel cell stack in the relationship between the current of the fuel cell stack and the voltage of the fuel cell stack to which the weight information is applied.

The determining of the humidity state of the fuel cell stack may include determining the fuel cell stack to be in a dry state when the counted number of times the voltage of the fuel cell stack, which is lower than the reference voltage corresponding to the current of the fuel cell stack, exceeds a predetermined number of times in the relationship between the current of the fuel cell stack and the voltage of the fuel cell stack to which the weight information is applied.

The method of controlling a fuel cell system further comprising increasing a humidity of the fuel cell stack when the fuel cell stack is a dry state.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings.

DETAILED DESCRIPTION OF EXEMPLARY EMBODIMENTS

Figure 1:
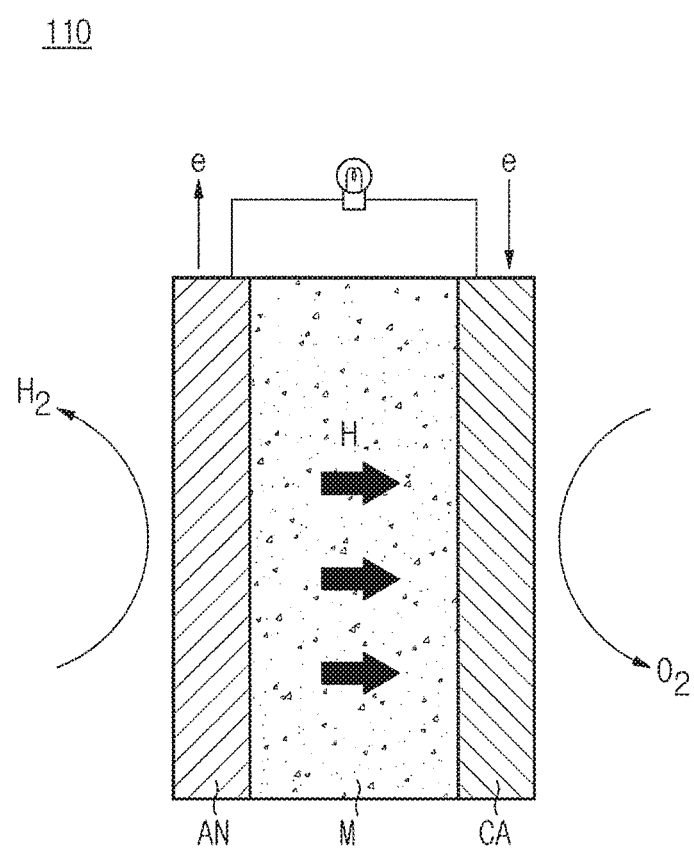
FIG. 1 is a schematic view illustrating a unit cell of a fuel cell for explaining an electricity generation principle of a fuel cell.

Like reference numerals refer to like elements throughout the specification. This specification does not describe all the elements of the embodiments, and duplicate contents of the general contents or embodiments in the technical field of the present disclosure will be omitted. As used herein, the terms 'part, module, member, block' may be embodied in software or hardware, and in accordance with the embodiments, a plurality of subsystems, modules, it is also possible that a single 'part, module, member, block' includes a plurality of components.

Throughout the specification, when a part is referred to as being "connected" to another part, it includes not only directly connected but also indirectly connected, and the indirect connection includes connection through a wireless communication network do.

When an element is referred to as including an element, it is to be understood that the element may include other elements, without departing from the spirit or scope of the present disclosure.

Throughout the specification, when a member is located on another member, it includes not only when a member is in contact with another member but also when there is another member between the two members.

The terms first, second, etc. are used to distinguish one element from another, and the elements are not limited by the above-mentioned terms.

The singular forms "a", "an", and "the" include plural referents unless the context clearly dictates otherwise.

In each step, the identification code is used for convenience of explanation, the identification code does not describe the order of each step, and each step may be performed differently from the order specified unless clearly specified in the context.

Hereinafter, the working principle and embodiments of the present disclosure will be described with reference to the accompanying drawings.

FIG. 1 is a schematic view illustrating a unit cell of a fuel cell for explaining an electricity generation principle of a fuel cell.

As illustrated in FIG. 1, when air containing oxygen is supplied to a cathode (CA) of a unit cell of a fuel cell and hydrogen is supplied to an anode (AN) of the unit cell, a reverse reaction of electrolysis of water proceeds through an electrolyte membrane (M).

A plurality of unit cells are connected to each other in series to constitute one fuel cell stack (hereinafter, referred to as a stack), and the stack may generate a higher voltage than that one unit cell generates.

Figure 2:
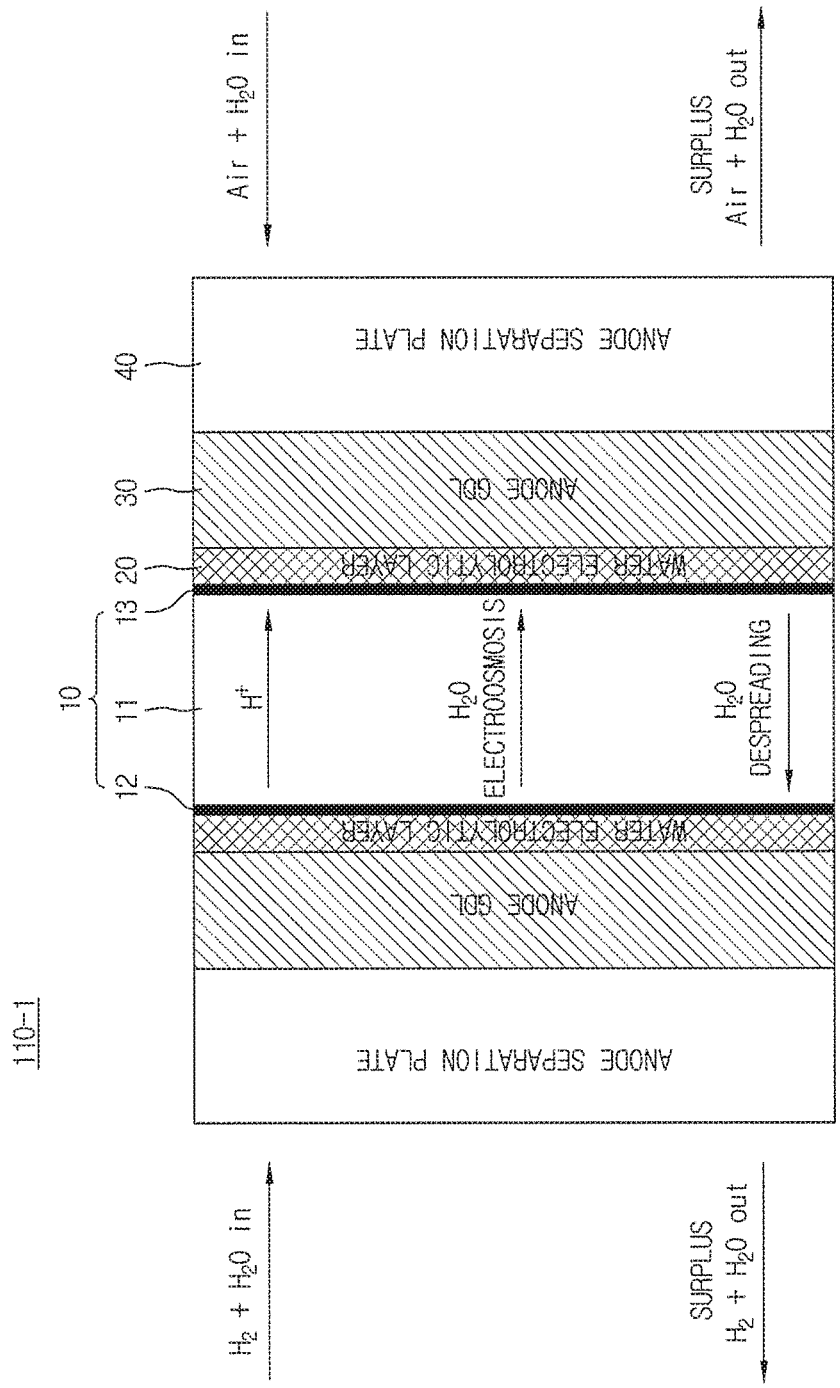
FIG. 2 is a view illustrating a structure of a unit cell of a fuel cell.

FIG. 2 is a view illustrating a structure of a unit cell of a fuel cell.

As illustrated in FIG. 2, a unit cell 110-1 of the fuel cell stack according to an embodiment includes a membrane electrode assembly (MEA) 10, a water electrolysis layer 20 disposed adjacent to the membrane electrode assembly 10, and a gas diffusion layer 30 disposed adjacent to the water electrolytic layer 20. In detail, the water electrolysis layer 20, the gas diffusion layer 30, and a separation plate 40 may be consecutively stacked on the left and right sides of the central membrane electrode assembly 10.

The membrane electrode assembly 10 has a fuel electrode 12 (also referred to as an anode, a hydrogen electrode or an oxidant electrode) and an air electrode 13 (also referred to as a cathode, an oxygen electrode or a reducing electrode) on either side of a polymer electrolyte membrane 11 thereof. That is, a membrane electrode assembly 10 is formed by integrating the fuel electrode 12 and the air electrode 13 with a polymer electrolyte membrane 11. The configuration and performance of the membrane electrode assembly 10 contribute to the operation of a polymer electrolyte fuel cell.

High-quality hydrogen is supplied to the fuel electrode 12 to cause an electrochemical reaction, and the supplied hydrogen is separated into hydrogen ions and electrons by a catalyst to generate electricity. A water decomposition catalyst adapted to electrolyze water around the fuel electrode 12 may be applied to the fuel electrode 12 when applying a reverse voltage between the electrodes. For example, a water decomposition catalyst such as manganese phosphate may be applied to the fuel electrode 12. However, the example of the water decomposition catalyst applicable to the fuel electrode 12 is not limited thereto, and it may include examples that may be derived by a person skilled in art.

The water decomposition catalyst may accelerate electrolysis of water generated around the fuel electrode 12 when a reverse voltage is applied. Accordingly, by operating the fuel cell system 100 during application of the reverse voltage, the electrodes are prevented from being damaged. Details thereof will be described later.

Air containing oxygen is supplied to the air electrode 13 to cause an electrochemical reaction, and the supplied oxygen combines with hydrogen ions and electrons generated in the fuel electrode 12 to produce water.

The gas diffusion layer 30 is provided between the separation plate 40 and the electrodes to distribute reaction gas evenly and transfer the generated electrical energy.

The separation plate 40 serves to move reaction gases and cooling water, and a flow path may be formed in the separation plate 40. In order for an electrochemical reaction to take place in the membrane electrode assembly 10 to produce a current, reactant needs to be supplied and water generated as a by-product needs to be removed. Further, in order for electrons to move through an external circuit, a current collector is required. The separation plate 40 serves as a current collector.

Figure 3:
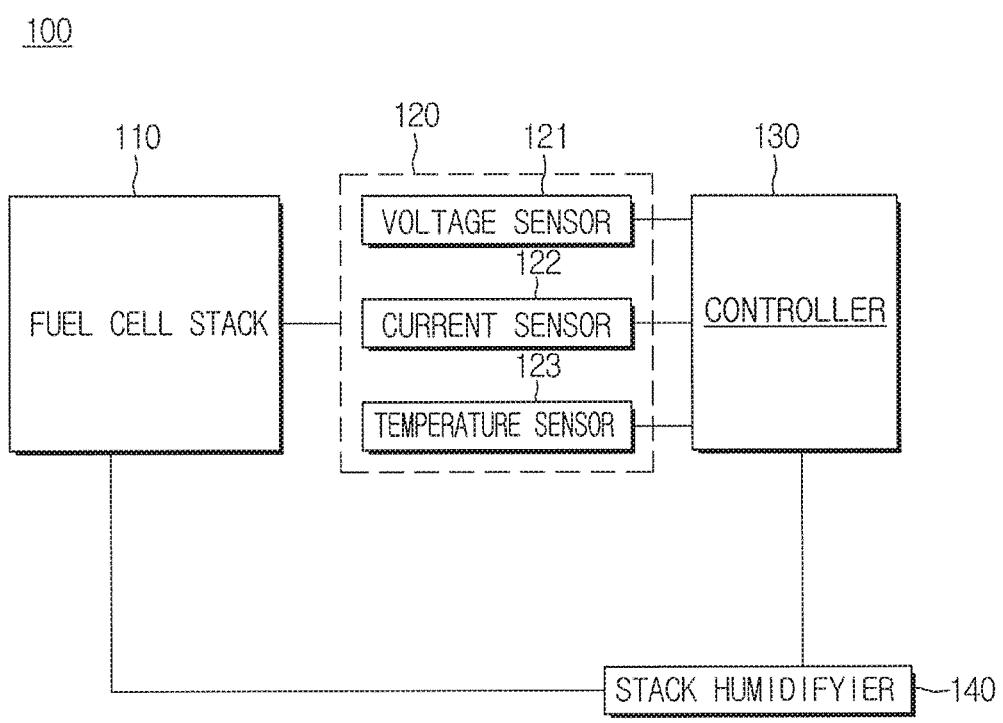
FIG. 3 is a control block diagram illustrating a fuel cell system according to an embodiment.

FIG. 3 is a control block diagram illustrating a fuel cell system according to an embodiment.

As illustrated in FIG. 3, a fuel cell system 100 may include a fuel cell stack 110, a sensor 120, a controller 130 and a stack humidifier 140.

The fuel cell stack 110 may include a fuel electrode and an air electrode.

The sensor 120 may include a voltage sensor 121, a current sensor 122, and a temperature sensor 123.

The voltage sensor 121 may be configured to sense the voltage of the fuel cell stack 110.

The current sensor 122 may be configured to sense the current of the fuel cell stack 110.

The stack voltage and the stack current sensed through the voltage sensor 121 and the current sensor 122 may be used to calculate a humidification state of the fuel cell stack 110, but are not limited thereto.

The temperature sensor 123 may be configured to sense the temperature of the fuel cell stack and the outdoor air temperature, as well as the temperature of cooling water at a stack outlet end of the fuel cell stack 110. At this time, the temperature sensor 123 may be formed in plural and provided at desired positions. While the temperature of the fuel cell stack obtained by the temperature sensor may be used to derive the durability of the fuel cell stack.

The controller 130 may acquire weight information on the basis of a relationship between a current flowing in the fuel cell stack and a voltage applied to the fuel cell stack that are obtained through the sensor 120, and may determine a humidity state of the fuel cell stack 110 on the basis of a combination of the weight information, the fuel cell stack current and the fuel cell stack voltage. The controller 130 may derive a range of currents mainly used by a user on the basis of a usage time of the fuel cell and a usage time of the fuel cell for each magnitude of current flowing in the fuel cell stack 110, that is, on the basis of a change in the current of the fuel cell stack 110, and also derive a relationship between a usage time of the fuel cell and a continuous time corresponding to a magnitude of current. Details thereof will be described later.

In addition, the controller 130 may acquire temperature information of the fuel cell stack acquired by the sensor 120, and may derive the durability of the fuel cell stack 110 based on the temperature information. Since it is obvious to a person skilled in the art to derive the durability of the stack 110 based on the temperature of the fuel cell stack 110, details thereof will be omitted.

The controller 130 may change a usage rate and a continuous usage rate on the basis of the durability of the fuel cell stack 110. Specifically, the controller 130 may determine a constant that is multiplied by the utilization rate and the continuous utilization rate.

The controller 130 may reset all the information when the usage time of the fuel cell exceeds a predetermined time. Accordingly, the humidification state of the fuel cell stack 110 may be accurately derived in practice.

The controller 130 may derive a voltage corresponding to a current in deriving the humidification state of the fuel cell stack 110. When the voltage corresponding to the current is lower than a predetermined voltage value, the fuel cell stack 110 is determined in a dry state. As described above, in order for the battery to normally supply electric energy, the fuel cell stack 110 needs to maintain a humidified state. A battery is provided to supply a voltage. As the voltage is not normally supplied with the current flowing, the battery does not reach a predetermined voltage value and fails to supply the electric energy smoothly. Accordingly, the state of the fuel cell stack 110 may be determined based on the operation described above. The controller 130 may count the number of times that the voltage corresponding to the current is smaller than the predetermined voltage, and may determine that the fuel cell stack 110 is dry when the counted number of times exceeds a predetermined number of times.

According to one embodiment of the present disclosure, weight information including a usage rate and a continuous usage rate is applied to a relationship between the current and the voltage, so that the humidity state of the fuel cell stack 110 may be accurately determined in practice. A detailed description related thereto will be described later.

When it is determined that the fuel cell stack is in the dry state, the controller 130 may control a stack humidifier 140 to supply moisture to the fuel cell stack to deviate from the dry state.

The controller 130 may include a memory for storing a program for performing the above-mentioned and later-described operations and various data related thereto, a processor for executing a program stored in the memory, a hydraulic control unit (HCU), and a Micro controller unit (MCU). In addition, the controller 130 may be integrated in a system on chip (SOC) built in a vehicle 1, and may be operated by a processor. However, the vehicle 1 includes a plurality of SOCs rather than only one SOC, so that it is not limited that the controller 100 is integrated into only SOC.

The controller 100 may be a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, or the like. However, the present disclosure is not limited thereto and may be implemented in any other form known in the art.

The controller 130 may communicate with the sensor 120 and the stack humidifier 140. The controller 130 may use a CAN Controller Area Network (CAN) of the vehicle. The CAN network refers to a network system used for data transmission and control between electronic control units (ECUs) of a vehicle. Specifically, the CAN transmits data through a pair of data wires that are twisted or are shielded by a coating. The CAN operates according to a multi-master principle in which a large number of ECUs in a master/slave system perform master function. In addition, the controller 130 may receive a detection value transmitted from the sensor 120 via an in-vehicle wired network, such as Local Interconnect Network (LIN) or Media Oriented System Transport (MOST) of the vehicle 1 or a wireless network, such as the Bluetooth.

When the fuel cell stack is determined to be in a dry state, the controller 130 controls the stack humidifier 140 to perform a recovery control for humidifying the fuel cell stack 110.

Supplying the fuel cell stack 110 with moisture may be achieved by one or more methods, including a method of increasing a relative humidity target value of stack air, a method of reducing a standard air flow, a method of forcedly cooling stack, and a method of avoiding low stack output.

Figure 4:
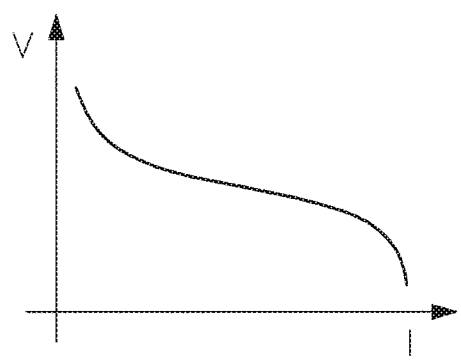
FIG. 4 is a graph showing a relationship between a current and a voltage of a fuel cell according to an embodiment.

FIG. 4 is a graph showing a relationship between a current and a voltage of a fuel cell according to an embodiment.

Referring to FIG. 4, a relationship between the current and the voltage is shown, to which weight information has not applied. The controller 130 may measure the current and the voltage of the fuel cell stack 110 to derive the relationship. The fuel cell stack 110 of the fuel cell may be reduced in voltage as the flowing current increases. The relationship between the voltage and the current at the time of initial use of the fuel cell may serve as a reference value for determining a dry state of the fuel cell stack 110 which will be described later. That is, the user may set a reference time at the initial stage of using the fuel cell, and the relationship between the current and the voltage measured at the reference time may be a reference value for determining the humidifying state of the fuel cell stack which will be described later. Specifically, a voltage value corresponding to the magnitude of the current in the relationship between the current and the voltage measured during the reference time is a voltage value in a normal state of the fuel cell stack, so that the controller sets a voltage value corresponding to the magnitude of the current for the reference time as a reference voltage. When weight information is applied to the relationship between the current and the voltage to be described later, it is possible to determine the humidification state of the fuel cell stack 110 by applying a weight to a range of the current mainly used by the user. The graph shown in FIG. 4 is an example of the relationship between the current and the voltage of the fuel cell stack, and there is no limitation on the form of the graph.

Figure 5A:
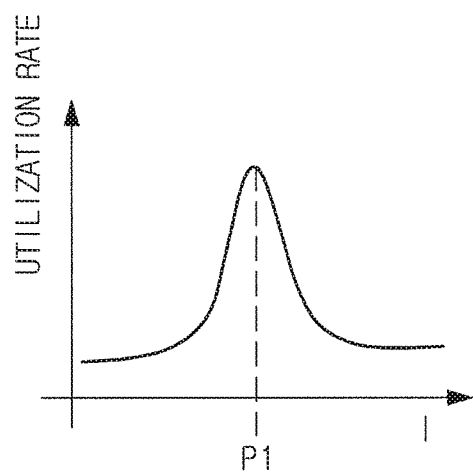
FIG. 5A is a graph showing a utilization rate corresponding to a current according to an embodiment.

FIG. 5A is a graph showing a utilization rate corresponding to a current according to an embodiment.

Referring to FIG. 5A, the X-axis of the graph of FIG. 5A represents the magnitude of the current and the Y-axis represents a utilization rate of current U1. The utilization rate of current U1 may be derived from the following equation 1.

$$U1 = \frac{T_i}{T_d} \quad \text{[Equation 1]}$$

Referring to equation 1, Ti refers to a usage time per current, and Td refers to the total usage time of the fuel cell. The range of the current mainly used by the user is derived by deriving the usage time for each current relative to the total usage time of the fuel cell, and weight information is applied to current and voltage measurement values corresponding to the derived magnitude of current so that the humidity state of the stack may be accurately derived in practice. Referring to FIG. 5A, since a point P1 has the highest utilization rate, the controller determines that the user mainly uses current in the vicinity of P1, and determines the dry state of the stack by putting more weight on the vicinity of P1

Figure 5B:
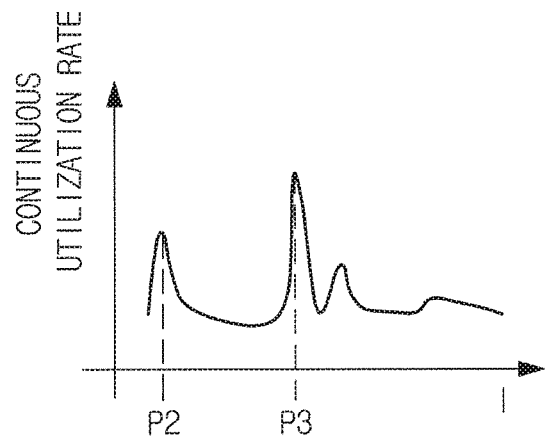
FIG. 5B is a graph showing a continuous utilization rate corresponding to a current according to an embodiment.

FIG. 5B is a graph showing a continuous utilization rate corresponding to a current according to an embodiment.

Referring to FIG. 5B, the X-axis of the graph shown in FIG. 5B represents the magnitude of the current and the Y-axis represents a continuous utilization rate of current U2. The continuous utilization rate of current may be derived based on the following equation 2.

$$U2 = \frac{T_{is}^5}{T_{ds}} \quad \text{[Equation 2]}$$

Referring to equation 2, Tis refers to a maximum continuous usage time per current, and Tds refers to the sum of continuous usage time of the fuel cell. The range of the current that is mainly continuously used by the user is derived by deriving the maximum continuous time for each current relative to the sum of continuous use time of the entire fuel cell, and weight is applied to current and voltage measurement values corresponding to the derived magnitude of current, so that the humidity state of the stack may be accurately derived in practice. Particularly, as the user may derive the time in which the fuel cell is substantially continuously used, the continuous usage time for each current may enable more accurate and substantial stack humidification state to be derived together with the usage time for each current shown in FIG. 5A. Referring to FIG. 5B, it is determined that the points P2 and P3 have a high continuous utilization rate, and the controller determines that the user frequently uses the currents near P2 and P3 continuously and determines the humidification state of the stack by putting more weight on the vicinity of P1.

The controller may derive the relationship between the current and the usage time described with reference to FIGS. 5A and 5B on the basis of the current, the voltage, and the usage time of the fuel cell described above, and may derive a graph based thereon. However, the forms of the graphs shown in FIGS. 5A and 5B are only examples for explaining the operation of the present disclosure.

Figure 6:
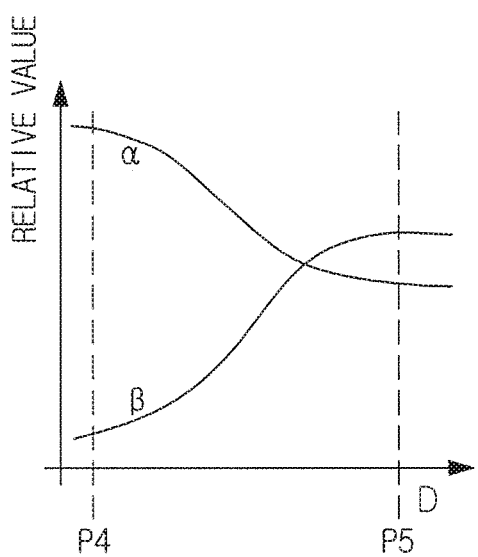
FIG. 6 is a graph showing values for applying durability of a stack to a utilization rate and a continuous utilization rate according to one embodiment applied to the usage and the continuous utilization rate.

FIG. 6 is a graph showing values for applying the durability of a stack to a utilization rate and a continuous utilization rate according to one embodiment applied to the usage and the continuous utilization rate.

Referring to FIG. 6, the X-axis of FIG. 6 shows the progress of the stack used, and the Y-axis shows the values for changing the utilization rate and the continuous utilization rate.

In order to derive the weight information, proportions of the usage rate and the continuous usage rate reflected are varied depending on the progress of the stack used. The fuel cell with a less progress of the stack used is more likely to have a reversible deterioration by the nature of the fuel cell. Therefore, the probability of occurrence of the dry state of the fuel cell stack due to momentary use of the fuel cell may be higher than that due to the accumulated use of the fuel cell.

Therefore, the accuracy of the determination of the dry state of the stack may be increased by reflecting the durability of the stack in real time. On the other hand, when the progress of the stack used is high, that is, when the durability is low, the probability of occurrence of the dry state of the stack due to irreversible deterioration may increase. Accordingly, the controller adjusts a proportion of reflecting the continuous utilization rate.

However, even when the progress of the stack used is high (P5), the dry state of the stack due to reversible deterioration may frequently occur. Accordingly, the difference in the two proportions in P5 may be smaller than that in P4 where the progress of the stack used is low. The controller may derive the dry state of the fuel cell stack more effectively by adjusting the proportions of reflecting the utilization rate and the continuous utilization rate based on the durability of the stack through the above operation.

Figure 7:
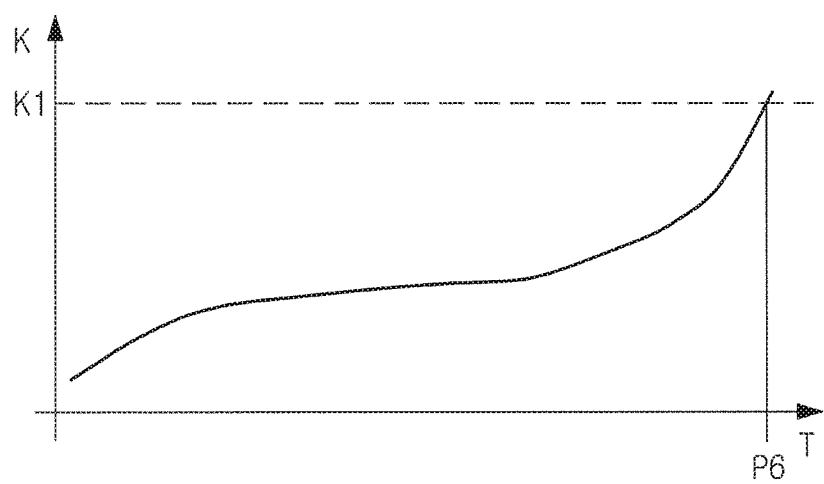
FIG. 7 is a graph showing a method of determining a dry state of a stack according to an embodiment.

FIG. 7 is a graph showing a method of determining a dry state of a stack according to an embodiment.

Referring to FIG. 7, the X-axis represents the usage time of the fuel cell, and the vertical axis represents the number of counts for deriving the dry state of the fuel cell stack.

The number of counts K for deriving the dry state of the fuel cell stack may be derived by the following equation.

$$K = \sum_{T1}^{T2} \sum_{I=0}^{I_{max}} (U1 + U2) * \text{Count} \qquad \text{[Equation 3]}$$

Referring to equation 3, as described above, U1 denotes the utilization rate and U2 denotes the continuous utilization rate. Therefore, U1+U2 refers to weight information reflecting utilization rate and continuous utilization rate. Count operation is an operation for detecting the dry state of the stack, and is an operation for measuring the voltage corresponding to the current flowing in the stack and counting the number of times the voltage is lower than a predetermined reference voltage. The Count operation used to detect the dry state of the stack is obvious to those skilled in the art, and a detailed description thereof will be omitted.

The controller may determine the dry state of the stack by applying the weight information reflecting the utilization rate and the continuous utilization rate to the Count operation based on equation 3. The user may set an arbitrary K value, and in FIG. 7, the user sets the arbitrary K value to K1. According to use of the fuel cell, the K value increases to exceed the predetermined K1 value (P6), and the voltage corresponding to the current flowing in the stack is measured. When the number of times the voltage, which is lower than the predetermined reference voltage, exceeds a predetermined number of times, the stack is determined to be in the dry state.

The user may set a time range (T1, T2) for deriving the K value. That is, when a usage time of the fuel cell exceeds a predetermined measurement time (T2−T1), the current and voltage value measured for the predetermined measurement time (T2−T1) affect the deriving of the dry state of the stack as cumulative data. Therefore, when the usage time of the fuel cell exceeds a predetermined time, the controller may reset the weight information, the current, and the voltage to determine the humidification state of the fuel cell stack.

The controller may determine the dry state of the stack by reflecting the durability of the stack on the weight information as described above.

$$K = \sum_{T1}^{T2} \sum_{I=0}^{I_{max}} (\alpha \cdot U1 + \beta \cdot U2) * \text{Count} \qquad \text{[Equation 4]}$$

Different from equation 3, equation 4 has $\alpha$ and $\beta$ reflected on the utilization rate and the continuous utilization rate. Referring again to FIG. 6, when the progress of the stack used is not great, that is, when the stack has a high durability (P4), the value of $\alpha$ is larger than the value of $\beta$, so that the value of $\alpha$ has a greater influence on the derivation of the dry state compared to the value of $\beta$. On the other hand, when the progress of the stack used is great, that is, the durability of the stack is low (P5), the value $\beta$ is larger than the value $\alpha$, so that the continuous utilization rate has a greater influence on the derivation of the dry state compared to the utilization rate. The description related to this is described with reference to FIG. 7, and a detailed description thereof will be omitted.

The controller may more accurately derive the dry state of the stack based on the above-described operation.

Figure 8:
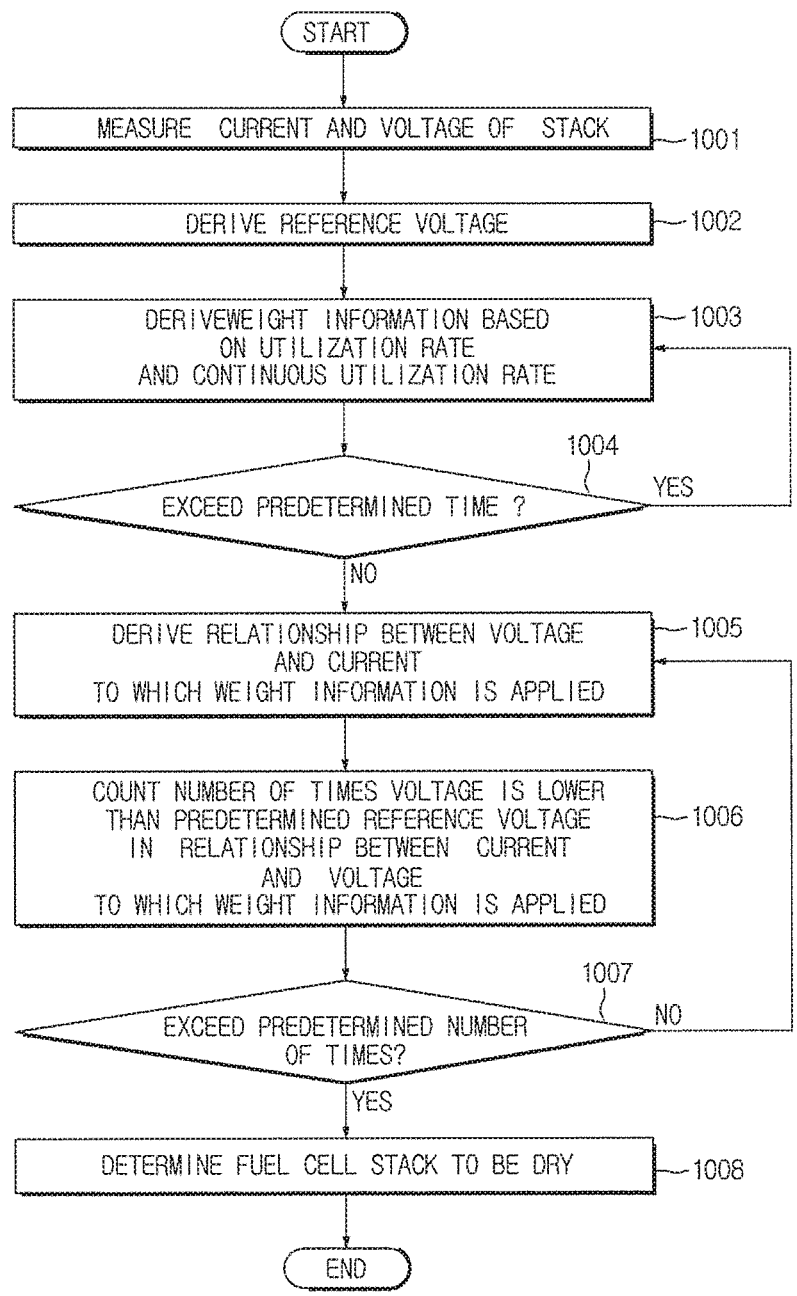
FIG. 8 is a flowchart showing a control method for a fuel cell system according to an embodiment.

FIG. 8 is a flowchart showing a control method for a fuel cell system according to an embodiment.

Referring to FIG. 8, the sensor may measure a current flowing through the fuel cell stack and a voltage (1001). Based on the relationship between the current and the voltage measured at the beginning of the use of the fuel cell, the control unit may derive a reference voltage corresponding to the current used (1002). Further, the above-described utilization rate and the continuous utilization rate may be derived on the basis of the measured current. The utilization rate and the continuous utilization rate are used to derive the range of the magnitude of current that is mainly used by the user, and a detailed description thereof will be omitted. The controller may derive the weight information based on the utilization rate and the continuous utilization rate (1003). However, in order to prevent previous cumulative information from influencing the deriving of the humidity state of the fuel cell stack, when a predetermined time is exceeded, the weight information is reset and the utilization rate and the continuous utilization rate may be derived (1004). The weight information may be used to more effectively utilize the humidity state of the fuel cell stack by reflecting the range of the current actually used by the user on the measured current and voltage (1005). The controller may derive a relationship between the current and the voltage to which the weight information is applied and may count the number of times the value of the voltage corresponding to the current is smaller than the value of the reference voltage (1006). When the counted number of times is greater than or equal to a predetermined number of times, that is, the voltage corresponding to the current is small, the stack of the fuel cell is determined in a dry state (1008).

As is apparent from the above, the fuel cell system and the method of controlling the same can derive an accurate humidification state of the fuel cell stack by reflecting the usage pattern of the fuel cell and the durability of the fuel cell.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored. For example, there may be a ROM (Read Only Memory), a RAM (Random Access Memory), a magnetic tape, a magnetic disk, a flash memory, an optical data storage device and the like.

The embodiments described with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A fuel cell system comprising:
a fuel cell stack;
a sensor configured to sense a current and a voltage of the fuel cell stack; and
a controller configured to acquire weight information based on a relationship between a usage time of a fuel cell and the current and voltage of the fuel cell stack and to determine a humidity state of the fuel cell stack based on the weight information, the current of the fuel cell stack, and the voltage of the fuel cell stack,
wherein the controller acquires the weight information including a utilization rate that is calculated based on a relationship between the usage time of the fuel cell and a usage time of the fuel cell by each magnitude of the current of the fuel cell stack, and
wherein the controller acquires the weight information including a continuous utilization rate that is calculated based on a relationship between a continuous usage time of current of the fuel cell stack and a continuous usage time of current of the fuel cell stack by each magnitude of the current of the fuel cell stack.

2. The fuel cell system according to claim 1, wherein the sensor is further configured to sense a temperature of the fuel cell stack, and
wherein the controller is further configured to:
acquire a durability of the fuel cell stack based on the temperature of the fuel cell stack; and
acquire the weight information by changing the utilization rate and the continuous utilization rate based on the durability of the fuel cell stack.

3. The fuel cell system according to claim 1, wherein the controller resets the weight information, the current of the fuel cell stack, and the voltage of the fuel cell stack when the usage time of the fuel cell exceeds a reference time.

4. The fuel cell system according to claim 1, wherein the controller calculates a reference voltage corresponding to the current of the fuel cell based on a relationship between the current of the fuel cell stack and the voltage of the fuel cell stack when the usage time of the fuel cell is less than a predetermined reference time.

5. The fuel cell system according to claim 4, wherein the controller is configured to:
calculate a relationship between the current of the fuel cell stack and the voltage of the fuel cell stack to which the weight information is applied; and
count a number of times the voltage of the fuel cell stack, which is lower than the reference voltage corresponding to the current of the fuel cell stack in the relationship between the current of the fuel cell stack and the voltage of the fuel cell stack to which the weight information is applied.

6. The fuel cell system according to claim 5, wherein the controller determines the fuel cell stack to be in a dry state when the counted number of times the voltage of the fuel cell stack, which is lower than the reference voltage corresponding to the current of the fuel cell stack, exceeds a predetermined number of times in the relationship between the current of the fuel cell stack and the voltage of the fuel cell stack to which the weight information is applied.

7. The fuel cell system according to claim 1, further comprising a stack humidifier configured to increase a humidity of the fuel cell stack,
wherein the controller increases the humidity of the fuel cell stack by using the stack humidifier when the fuel cell stack is in a dry state.

8. A method of controlling a fuel cell system, the method comprising steps of:
sensing a current and a voltage of a fuel cell stack;
acquiring weight information based on a relationship between a usage time of a fuel cell and the current and voltage of the fuel cell stack; and
determining a humidity state of the fuel cell stack based on the weight information, the current of the fuel cell stack, and the voltage of the fuel cell stack,
wherein the step of acquiring the weight information includes acquiring the weight information including a utilization rate that is calculated based on a relationship between the usage time of the fuel cell and a usage time of the fuel cell by each magnitude of the current of the fuel cell stack, and
wherein the step of acquiring the weight information includes acquiring the weight information including a continuous utilization rate that is calculated based on a relationship between a continuous usage time of current of the fuel cell stack and a continuous usage time of current of the fuel cell stack by each magnitude of current of the fuel cell stack.

9. The method according to claim 8, further comprising sensing a temperature of the fuel cell stack,
wherein the step of acquiring the weight information includes:
acquiring a durability of the fuel cell stack based on the temperature of the fuel cell stack; and
acquiring the weight information by changing the utilization rate and the continuous utilization rate based on the durability of the fuel cell stack.

10. The method according to claim 8, wherein the step of determining the humidity state of the fuel cell stack includes resetting the weight information, the current of the fuel cell stack, and the voltage of the fuel cell stack when the usage time of the fuel cell exceeds a reference time.

11. The method according to claim 8, wherein the step of determining the humidity state of the fuel cell stack includes calculating a reference voltage corresponding to the current of the fuel cell based on a relationship between the current of the fuel cell stack and the voltage of the fuel cell stack when the usage time of the fuel cell is less than a predetermined reference time.

12. The method according to claim 11, wherein the step of determining a humidity state of the fuel cell stack includes:
   calculating a relationship between the current of the fuel cell stack and the voltage of the fuel cell stack to which the weight information is applied; and
   counting a number of times the voltage of the fuel cell stack, which is lower than the reference voltage corresponding to the current of the fuel cell stack in the relationship between the current of the fuel cell stack and the voltage of the fuel cell stack to which the weight information is applied.

13. The method according to claim 12, wherein the step of determining the humidity state of the fuel cell stack includes determining the fuel cell stack to be in a dry state when the counted number of times the voltage of the fuel cell stack, which is lower than the reference voltage corresponding to the current of the fuel cell stack, exceeds a predetermined number of times in the relationship between the current of the fuel cell stack and the voltage of the fuel cell stack to which the weight information is applied.

14. The according to claim 8, further comprising increasing a humidity of the fuel cell stack when the fuel cell stack is in a dry state.

* * * * *